(12) United States Patent
Woo et al.

(10) Patent No.: US 11,316,156 B2
(45) Date of Patent: Apr. 26, 2022

(54) PRE-LITHIATION USING LITHIUM METAL AND INORGANIC COMPOSITE LAYER

(71) Applicant: LG CHEM, LTD., Seoul (KR)

(72) Inventors: Sang Wook Woo, Daejeon (KR); Eun Kyung Kim, Daejeon (KR); Yoon Ah Kang, Seoul (KR); Jun Hyuk Song, Daejeon (KR); Oh Byong Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/541,737

(22) Filed: Aug. 15, 2019

(65) Prior Publication Data
US 2019/0372118 A1    Dec. 5, 2019

Related U.S. Application Data

(63) Continuation of application No. PCT/KR2018/008347, filed on Jul. 24, 2018.

(30) Foreign Application Priority Data

Aug. 11, 2017  (KR) .......................... 10-2017-0102252

(51) Int. Cl.
*H01M 4/485* (2010.01)
*H01M 4/04* (2006.01)
*H01M 4/02* (2006.01)

(52) U.S. Cl.
CPC ......... *H01M 4/485* (2013.01); *H01M 4/0404* (2013.01); *H01M 2004/021* (2013.01); *H01M 2004/027* (2013.01)

(58) Field of Classification Search
CPC ........... H01M 2004/028; H01M 4/368; H01M 4/405; H01M 4/485; H01M 2004/027
See application file for complete search history.

(56) References Cited

U.S. PATENT DOCUMENTS

| | | | | |
|---|---|---|---|---|
| 2005/0130043 A1* | 6/2005 | Gao | ...................... | H01M 4/043 429/231.95 |
| 2005/0244715 A1 | 11/2005 | Cho et al. | | |

(Continued)

FOREIGN PATENT DOCUMENTS

| | | |
|---|---|---|
| CN | 104332657 A | 2/2015 |
| CN | 105449165 A | 3/2016 |

(Continued)

OTHER PUBLICATIONS

International Search Report issued in PCT/KR2018/008347 (PCT/ISA/210), dated Nov. 1, 2018.

(Continued)

*Primary Examiner* — Tabassom Tadayyon Eslami
(74) *Attorney, Agent, or Firm* — Birch, Stewart, Kolasch & Birch, LLP

(57) ABSTRACT

A method of pre-lithiating a negative electrode for a secondary battery, including: dispersing a lithium metal powder, an inorganic material powder and a binder in a solvent to prepare a mixed solution; and applying the mixed solution to the negative electrode to form a lithium metal-inorganic composite layer on the negative electrode, thereby forming the pre-lithiated negative electrode. Also, a method for pre-lithiating a negative electrode having a high capacity by a simple process. Further, a negative electrode for a secondary battery manufactured through the pre-lithiation method provided in the present invention has an improved initial irreversibility, and secondary batteries manufactured using such a negative electrode for a secondary battery have excellent charge/discharge efficiency.

6 Claims, 1 Drawing Sheet

(56) References Cited

U.S. PATENT DOCUMENTS

| | | |
|---|---|---|
| 2010/0330430 A1 | 12/2010 | Chung et al. |
| 2012/0295155 A1 | 11/2012 | Deng et al. |
| 2014/0079961 A1 | 3/2014 | Zhong et al. |
| 2014/0272591 A1* | 9/2014 | Vanier .................... B82Y 30/00 429/231.8 |
| 2015/0050533 A1 | 2/2015 | Nam et al. |
| 2015/0357628 A1 | 12/2015 | Li et al. |
| 2016/0268627 A1* | 9/2016 | Lee .................... H01M 10/056 |
| 2017/0148581 A1 | 5/2017 | Gadkaree et al. |
| 2017/0279163 A1 | 9/2017 | Jang et al. |
| 2017/0338480 A1 | 11/2017 | Kim et al. |
| 2019/0036118 A1* | 1/2019 | Ofer .................... H01M 4/525 |

FOREIGN PATENT DOCUMENTS

| | | | |
|---|---|---|---|
| CN | 102916165 B | | 5/2016 |
| CN | 104332588 B | | 3/2017 |
| JP | 2010-160982 A | | 7/2010 |
| JP | 2010-160985 A | | 7/2010 |
| JP | 2011-249046 A | | 12/2011 |
| KR | 2005-0104625 | * | 1/2005 |
| KR | 10-2005-0104625 A | | 11/2005 |
| KR | 10-2010-0127730 A | | 12/2010 |
| KR | 10-1156608 B1 | | 6/2012 |
| KR | 10-2015-0020022 A | | 2/2015 |
| KR | 2015-0020022 | * | 2/2015 |
| KR | 10-1527730 B1 | | 6/2015 |
| KR | 10-2016-0037782 A | | 4/2016 |
| KR | 10-2016-0094652 A | | 8/2016 |

OTHER PUBLICATIONS

Arakawa, "Introduction to particle size measurement," Journal of the Society of Powder Technology, Japan, Jun. 10, 1980, vol. 17. No. 6, p. 299-307, with machine English translation.

Japanese Office Action and machine English translation dated Aug. 3, 2020 of the corresponding Japanese Patent Application No. 2019-543814.

* cited by examiner

PRE-LITHIATION USING LITHIUM METAL AND INORGANIC COMPOSITE LAYER

This application is a By-Pass Continuation of International Application PCT/KR2018/008347, filed on Jul. 24, 2018, which claims the benefit of priority based on Korean Patent Application No. 10-2017-0102252, filed on Aug. 11, 2017, the entire contents of which are incorporated herein by reference.

TECHNICAL FIELD

The present invention relates to a method for pre-lithiating a negative electrode for a secondary battery, and more particularly, to a pre-lithiation method by forming a lithium metal-inorganic composite layer on a negative electrode prior to assembling a lithium secondary battery.

BACKGROUND ART

As the price of energy sources increases due to depletion of fossil fuels and the interest in environmental pollution increases, the demand for environmentally friendly alternative energy sources becomes an indispensable factor for future life. Especially, as technological development and demand for mobile devices are increasing, demand for secondary batteries as energy sources is also rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are each formed by applying an active material to a surface of a current collector, then a separator is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

As a negative electrode active material of a lithium secondary battery, various types of carbon-based materials including artificial graphite, natural graphite, and hard carbon capable of inserting and desorbing lithium have been applied. Graphite such as artificial graphite or natural graphite in the carbon-based material has a low discharge voltage of 0.1 V compared to lithium, and batteries using graphite as a negative electrode active material exhibit a high discharge voltage of 3.6 V, which is advantageous in terms of energy density of a lithium battery and guarantees long life of the lithium secondary battery with excellent reversibility, and thus such batteries are most widely used.

However, when an electrode plate is manufactured using graphite as an active material, the density of the electrode plate is lowered, and the capacity may become low in terms of energy density per unit volume of the electrode plate, which is a problem. Further, since side reactions between graphite and the organic electrolyte are likely to occur at a high discharge voltage, there is a risk of ignition or explosion due to malfunction or overcharging of the battery.

In order to solve this problem, a negative electrode active material of an oxide has recently been developed. A metal-based active material such as Si or Sn has been proposed as a material capable of exhibiting a high capacity and capable of replacing lithium metal. Among them, Si has attracted attention due to low cost and high capacity (4200 mAh/g).

However, when a silicon-based negative electrode active material is used, the initial irreversible capacity becomes large. During charging and discharging of the lithium secondary battery, lithium discharged from the positive electrode is inserted into the negative electrode at the time of charging, and is discharged from the negative electrode at the time of discharging and returns to the positive electrode. In the case of a silicon negative electrode active material, a large amount of lithium inserted into the negative electrode does not return to the positive electrode at the time of initial charging and thus the initial irreversible capacity becomes large. When the initial irreversible capacity increases, there occurs a problem that the battery capacity and the cycle are rapidly reduced.

In order to solve the above problems, a method of pre-lithiating a silicon oxide negative electrode including a silicon-based negative electrode active material is known. As a pre-lithiation method, known methods include a method of producing an electrode by lithiating a negative electrode active material by a physicochemical method and a method of electrochemically pre-lithiating a negative electrode.

Conventional physico-chemical methods involve the risk of fire and explosion due to environmental factors to be carried out at high temperatures. Conventional electrochemical methods cannot control uniform irreversible capacity uniformly and increase production cost.

US Patent Publication No. 2015-0357628 discloses a technology of coating a negative electrode with a lithium-ceramic extruded product in which ceramic particles are mixed with molten lithium to improve electrode efficiency of a negative electrode active material having a high specific capacity, but since all of the above processes must be performed under an inert gas atmosphere due to the high reactivity of the lithium metal, the processes cannot be easily performed, which is a disadvantage.

Therefore, it is necessary to develop a technology for improving the initial irreversibility and improving the safety of the battery by pre-lithiating a negative electrode having a high capacity by using a relatively easy method.

DISCLOSURE

Technical Problem

The present invention has been devised to solve the problems of the prior art described above, and it is an object of the present invention to provide a pre-lithiation method for improving initial irreversibility of a negative electrode having a high capacity, in which lithium metal can be easily handled while simplifying a process.

It is another object of the present invention to provide a pre-lithiation method for improving the safety of a secondary battery.

Technical Solution

The present invention provides a method of pre-lithiating a negative electrode for a secondary battery, including:

dispersing a lithium metal powder, an inorganic material powder and a binder in a solvent to prepare a mixed solution; and applying the mixed solution to the negative electrode to form a lithium metal-inorganic composite layer on the negative electrode, thereby forming the pre-lithiated negative electrode. According to one embodiment of the present invention, the thickness of the lithium metal-inorganic composite layer is 0.5 to 20 µm.

According to another embodiment of the present invention, the inorganic material powder may include one or more selected from the group consisting of alumina ($Al_2O_3$), titanium dioxide ($TiO_2$), zirconium dioxide ($ZrO_2$), silicon dioxide ($SiO_2$), tin oxide ($SnO_2$), cerium oxide ($CeO_2$), magnesium oxide (MgO), calcium oxide (CaO) and yttria ($Y_2O_3$).

According to another embodiment of the present invention, prior to dispersing, there may be a step of adding the lithium powder, the inorganic material powder and the binder to the solvent, wherein 20 to 40 parts by weight of the lithium metal powder, 50 to 80 parts by weight of the inorganic material powder, and 1 to 10 parts by weight of the binder are added to a solvent.

According to another embodiment of the present invention, the mixed solution is applied to form the lithium metal-inorganic composite layer by coating, spraying, or lamination.

According to another embodiment of the present invention, the average particle diameter ($D_{50}$) of particles of the lithium metal powder is 5 to 50 µm.

According to another embodiment of the present invention, the average particle diameter ($D_{50}$) of particles of the inorganic material powder is 0.1 to 10 µm.

According to another embodiment of the present invention, after an initial activation charge, the lithium metal-inorganic composite layer is converted to an inorganic material layer due to the fact that lithium metal in the lithium metal-inorganic composite layer does not remain in metallic form.

According to another embodiment of the present invention, the negative electrode may include silicon oxide.

Another embodiment of the present invention provides a negative electrode for a secondary battery manufactured by applying the pre-lithiation method, and a secondary battery including the negative electrode.

Advantageous Effects

The present invention provides a method for pre-lithiating a negative electrode having a high capacity by a simple process. Further, a negative electrode for a secondary battery manufactured through the pre-lithiation method provided in the present invention has an improved initial irreversibility, and secondary batteries manufactured using such a negative electrode for a secondary battery have excellent charge/discharge efficiency.

In the negative electrode having the lithium metal-inorganic composite layer of the present invention, lithium is inserted into the negative electrode active material layer by pre-lithiation, so that the inorganic material remains in the composite layer, thereby protecting the surface of the negative electrode and improving the safety of the battery.

DETAILED DESCRIPTION OF THE PREFERRED EMBODIMENTS

Hereinafter, the present invention will be described in detail. The present invention is not limited by the following examples and experimental examples. The embodiments according to the present invention may be modified into various other forms, and the scope of the present invention should not be construed as being limited to the embodiments described below. The embodiments of the present invention are provided to more fully describe the present invention to those skilled in the art.

The pre-lithiation of a negative electrode for a secondary battery according to the present invention includes: dispersing a lithium metal powder, an inorganic material powder and a binder in a solvent to prepare a mixed solution; and applying the mixed solution to the negative electrode to form a lithium metal-inorganic composite layer on the negative electrode, thereby forming the pre-lithiated negative electrode. The negative electrode material of a lithium ion battery has a disadvantage that the initial irreversibility is large. In particular, the negative electrode of a Si-based material has a large volume change and surface side reaction, so that a large amount of lithium which is used during charging cannot be re-discharged at the time of discharging. In order to improve this initial irreversibility, if pre-lithiation is performed before the fabrication of the battery assembly, the side reaction occurs during the first charging in advance of discharging. Therefore, when the battery assembly is actually formed and charged/discharged, the first cycle is performed with a reduced irreversibility, thereby reducing the initial irreversibility.

Figure 1:
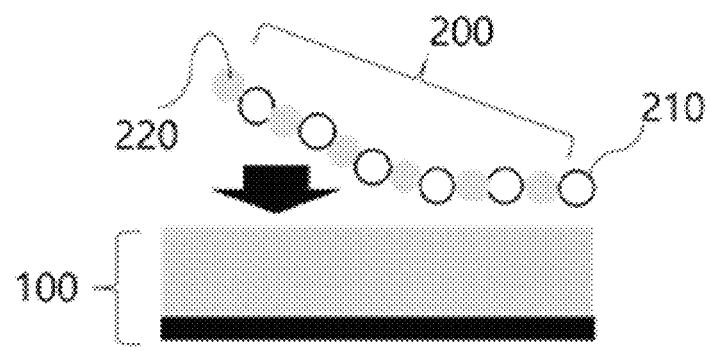
FIG. 1 is a view showing a state of one embodiment of applying a lithium metal-inorganic mixed solution of the present invention to a negative electrode.
Figure 2:
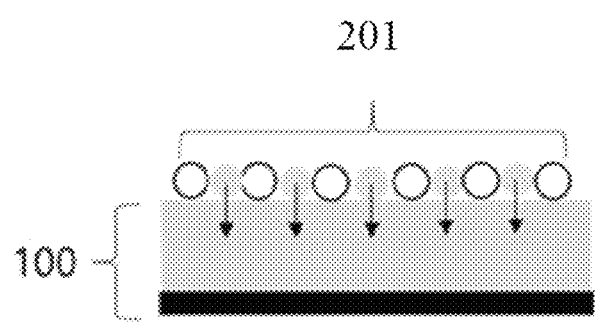
FIG. 2 is a view showing a state of one embodiment in which lithium is stored in a negative electrode from a lithium metal-inorganic composite layer formed on a negative electrode to be pre-lithiated.
Figure 3:
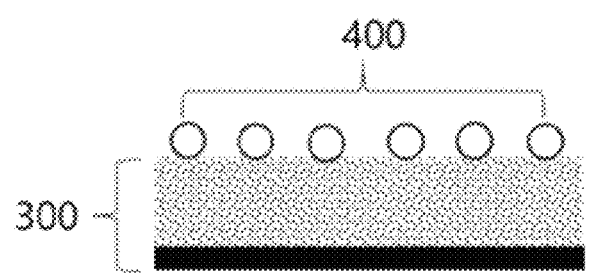
FIG. 3 is a view of one embodiment showing a negative electrode coated with an inorganic layer by a pre-lithiation method of the present invention.

In one embodiment the present invention, as shown in FIG. 1, a lithium metal-inorganic mixed solution 200 including lithium metal powder 220 and inorganic material powder 210 is applied to a negative electrode 100 (e.g., a SiO or a graphite electrode containing SiO having a large initial irreversibility). As shown in FIG. 2, a lithium metal-inorganic composite layer 201 is formed on a surface of the negative electrode 100, and the lithium metal powder 220 in the lithium metal-inorganic composite layer 201 is used for pre-lithiation to reduce the initial irreversibility. As shown in FIG. 3, an inorganic material layer 400 remains on the pre-lithiated negative electrode 300 and helps improve the safety of the negative electrode.

According to a preferred embodiment of the present invention, the thickness of the lithium metal-inorganic composite layer may be 0.5 to 20 µm. The thickness may more preferably be 1 to 10 µm, and may most preferably be 3 to 8 µm. When the thickness of the lithium metal-inorganic composite layer is in the range of 0.5 to 20 µm, the lithium metal-inorganic composite layer may exhibit the effect of improving the safety of the pre-lithiation and the battery.

According to a preferred embodiment of the present invention, the inorganic material powder may be one or more selected from the group consisting of alumina ($Al_2O_3$), titanium dioxide ($TiO_2$), zirconium dioxide ($ZrO_2$), silicon dioxide ($SiO_2$), tin oxide ($SnO_2$), cerium oxide($CeO_2$), magnesium oxide (MgO) calcium oxide (CaO) and yttria ($Y_2O_3$).

According to a preferred embodiment of the present invention, 20 to 40 parts by weight of the lithium metal powder, 50 to 80 parts by weight of the inorganic material powder, and 1 to 10 parts by weight of the binder may be added to the solvent. When the respective amounts of the composition of the lithium metal-inorganic material mixture added to the solvent are within the above range, the lithium metal-inorganic material mixture may exhibit an effect of improving the safety of the pre-lithiation and the negative electrode. According to another preferred embodiment of the present invention, 25 to 35 parts by weight of the lithium metal powder, 60 to 70 parts by weight of the inorganic material powder and 2-7 parts by weight of the binder may be added to the solvent. As the binder, commonly used binders such as PVDF and SBR based binders may be used. Also, polyacrylic acid (PAA), carboxymethyl cellulose (CMC), and polyimide binders may be used. If the content of the binder is less than 1 part by weight, the lithium metal-inorganic composite layer of the present invention may be easily detached from the negative electrode, and if it exceeds 10 parts by weight, it may not be preferable from the viewpoint of pre-lithiation.

According to a preferred embodiment of the present invention, the average particle diameter of particles of the lithium metal powder is 5 to 50 μm, preferably 30 to 40 μm.

According to a preferred embodiment of the present invention, the average particle diameter of particles of the inorganic material powder is 0.1 to 10 μm, more preferably 0.1 to 5 μm, and most preferably 0.5 to 1 μm. If the particle size of the inorganic material powder exceeds 10 μm, it may not be dispersed well in the solvent, which is not preferable.

The type of the solvent is not particularly limited as long as the lithium metal and the inorganic material powder are well dispersed in the solvent, and examples thereof include hexane, benzene, toluene, xylene and the like. In the examples of the present invention, n-hexane solution was used.

The solid content of the lithium metal and the inorganic material powder is 50 to 70 wt %, and with respect to the volume ratio of the solvent to the solid content, the solid content occupies 55 to 65 vol %, and the solvent occupies 35 to 45 vol %. When the solid concentration is less than 50 wt %, there may be a problem that the final target thickness is lowered due to a lower loading amount when the lithium metal-inorganic powder mixed slurry is applied on the electrode. If the solid concentration is more than 70 wt %, there may be a problem that the uniformity is lowered at the time of coating due to two high solid concentrations.

According to a preferred embodiment of the present invention, the method of forming the lithium metal-inorganic composite layer is one selected from coating, spraying, and lamination. That is, the mixed solution may be applied to form the lithium metal-inorganic composite layer by coating, spraying, or lamination. The mixed solution by mixing a lithium metal powder, an inorganic material powder and a binder in a solvent may be applied or sprayed to the negative electrode, sprayed, or a release film may be used, to thereby form a lithium metal-inorganic composite layer. A method of forming a lithium metal-inorganic composite layer using a release film may include the steps of coating the lithium metal-inorganic composite solution on a release film of a polymer material, laminating the coated release film on a negative electrode, and then releasing the release film.

According to a preferred embodiment of the present invention, the lithium metal-inorganic composite layer does not remain in the metallic form of lithium after the initial activation charge. Stated differently, after an initial activation charge, the lithium metal-inorganic composite layer is converted to an inorganic material layer due to the fact that lithium metal in the lithium metal-inorganic composite layer does not remain in metallic form.

The present invention also provides a secondary battery including a negative electrode manufactured by the above-described methods.

The secondary battery according to the present invention includes an electrode assembly in which two electrodes of different polarities are stacked in a state separated from each other by a separator. The electrode assembly includes a positive electrode including a positive electrode active material, a negative electrode including a negative electrode active material, and a separator.

Specifically, the positive electrode, for example, may be prepared by applying a mixture of a positive electrode active material, a conductive material and a binder on a positive electrode current collector, followed by drying. If necessary, a filler may be further added to the mixture.

The positive electrode active material according to the present invention may be mixed with a compound, which uses a lithium intercalation material as its main component, such as a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (wherein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (wherein, M=Co, Mn, Al, Cu, Fe, Mg, B or Ga, and x=0.01 to 0.3); lithium manganese composite oxide expressed by $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn); $LiMn_2O_4$ in which a part of Li in the formula is substituted with an alkaline earth metal ion; disulfide compound; and $Fe_2(MoO_4)_3$ or a compound oxide formed by combination thereof.

The positive electrode collector may generally have a thickness of 3 to 500 micrometers. The positive electrode current collector is not particularly limited as long as it has high conductivity without causing a chemical change in the battery. Examples of the positive electrode current collector may include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The conductive material may be added in an amount of 1 to 50% by weight based on the total weight of the mixture including the positive electrode active material. Such a conductive material is not particularly limited as long as it has electrical conductivity without causing a chemical change in the battery, and examples thereof may include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; and conductive materials such as polyphenylene derivatives and the like.

The binder may be added in an amount of 1 to 50% by weight, on the basis of the total weight of the mixture containing the positive electrode active material, as a component that assists in bonding between the active material and the conductive material and bonding to the current collector. Examples of such binders may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler may include olefin polymers such as polyethylene and polypropylene; fibrous materials such as glass fibers and carbon fibers.

Further, the negative electrode may be formed by coating a negative electrode material on a negative electrode collector and drying the negative electrode active material. The negative electrode may further include the above-described components.

The negative electrode current collector may generally have a thickness of 3 to 500 micrometers. The negative electrode current collector is not particularly limited as long as it has electrical conductivity without causing chemical changes in the battery, and examples thereof may include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness may be formed on the surface to enhance the bonding force of the negative electrode active material, and it can be used in various forms such as a film, a sheet, a foil, a net, a porous body, a foam, and a nonwoven fabric.

As the negative electrode active material of the present invention, a material capable of reversibly adsorbing/discharging lithium ions such as silicon (Si) and tin may be used. As long as such a material is used, it may be possible to exhibit the effects of the present invention in any of composite, alloy, compound, solid solution and composite negative electrode active material including silicon-containing material and tin-containing material. As the silicon-containing material, Si, $SiO_x$ (0.5<x<2.0) or an alloy, a compound or a solid solution which is generated by substituting part of Si or Si contained in $SiO_x$ with at least one element selected from the group consisting of B, Mg, Ni, Ti, Mo, Co, Ca, Cr, Cu, Fe, Mn, Nb, Ta, V, W, Zn, C, N, and Sn may be used.

These materials may constitute a negative electrode active material alone or may constitute a negative electrode active material by a plurality of kinds of materials. Examples of constituting the negative electrode active material by a plural kinds of materials include a compound containing Si, oxygen and nitrogen, a composite of a plurality of compounds containing Si and oxygen and having different composition ratios of Si and oxygen, and the like. Among these, $SiO_x$ (0.5<x<2.0) may be preferable because the discharge capacity density may be large and the expansion ratio at the time of filling may be smaller than that of Si.

The silicon oxide negative electrode is a negative electrode which uses silicon and oxides thereof as main materials in order to increase the capacity density of the negative electrode which uses the existing carbon material such as graphite. It has a theoretical capacity density of 4200 mAh/g, which is much higher than the theoretical capacity density of carbon material of 372 mAh/g, which can be suitably used as a negative electrode for a secondary battery. However, since the silicon oxide negative electrode is inferior in the stability of the form, the initial irreversible capacity is large, and there is a risk that the electrode capacity is reduced or the cell balance is collapsed, and thus a pre-lithiation process as in the present invention is required.

It is possible to use a commonly known polyolefin separator or a composite separator in which an organic and inorganic composite layer is formed on the olefin based material, as a separator for insulating the electrodes between the positive electrode and the negative electrode, and the present invention is not limited to these examples.

The electrolyte injected into the secondary battery may be a lithium salt-containing non-aqueous electrolyte, which is composed of a nonaqueous electrolyte and lithium. As the non-aqueous electrolyte, a non-aqueous electrolyte, a solid electrolyte, an inorganic solid electrolyte and the like may be used.

Examples of the non-aqueous electrolyte may include N-methyl-2-pyrrolidinone, propylene carbonate, ethylene carbonate, butylenecarbonate, dimethyl carbonate, diethyl carbonate, gamma-Butyrolactone, 1,2-dimethoxy ethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, and the like.

Examples of the organic solid electrolyte may include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte may include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a substance that is soluble in the non-aqueous electrolyte. The examples of the lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, and the like may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

Hereinafter, the present invention will be described in more detail through examples below. However, the following Examples and Experimental Examples are provided for illustrating the present invention, and the scope of the present invention is not limited by these Examples and Experimental Examples.

EXAMPLE 1

<Preparation of Negative Electrode>
92 wt % of SiO (negative electrode active material), 3 wt % of Denka Black (conductive material), 3.5 wt % of SBR (binder) and 1.5 wt % of CMC (thickener) were added to water, to thereby prepare a negative electrode mixture slurry.

The negative electrode mixture slurry was coated on one side of a copper collector, dried and rolled, and then punched to a predetermined size to produce a negative electrode.

<Formation of Lithium Metal-Inorganic Composite Layer on the Surface of Negative Electrode>
30% by weight of lithium metal powder ($D_{50}$: 5 to 50 μm, preferred 30-40 μm), 66% by weight of $Al_2O_3$ powder ($D_{50}$: 0.5 to 1 μm), and 4% by weight of binder (PVDF, polyvinylidene fluoride was used, but PTFE, polytetrafluoroethylene may be used) were added to a n-hexane solution and dispersed to prepare a mixed slurry. At this time, the mixing ratio of the solvent and the solid was 35 vol % as a solvent and 65 vol % as a solid. The mixed slurry thus prepared was coated on the surface of the SiO negative electrode and dried to form a lithium metal-$Al_2O_3$ composite layer having an average thickness of 5 μm on the surface of SiO negative electrode.

<Preparation of Lithium Secondary Battery>
A lithium metal foil (150 μm) was used as a counter electrode, and a polyolefin separator was interposed between the negative electrode and the counter electrode. Then an electrolytic solution in which 1 M lithium hexafluorophosphate ($LiPF_6$) was dissolved was injected into a solvent in which ethylene carbonate (EC) and diethyl carbonate (DEC) were mixed at a volume ratio of 50:50, to prepare a coin type half-cell.

EXAMPLE 2

A battery was prepared in the same manner as in Example 1, except that magnesium oxide (MgO) powder was used instead of $Al_2O_3$ powder.

EXAMPLE 3

A battery was prepared in the same manner as in Example 1, except that zirconium dioxide ($ZrO_2$) powder was used instead of $Al_2O_3$ powder.

EXAMPLE 4

A battery was prepared in the same manner as in Example 1, except that the thickness of the lithium metal-inorganic composite layer was adjusted to 3 μm.

EXAMPLE 5

A battery was prepared in the same manner as in Example 1, except that the thickness of the lithium metal-inorganic composite layer was adjusted to 8 μm.

EXAMPLE 6

A battery was prepared in the same manner as in Example 1 except that 20 wt % of lithium metal powder, 76 wt % of $Al_2O_3$ powder and 4 wt % of binder were used.

EXAMPLE 7

A battery was prepared in the same manner as in Example 1 except that 35 wt % of lithium metal powder, 61 wt % of $Al_2O_3$ powder and 4 wt % of binder were used.

COMPARATIVE EXAMPLE 1

A battery was prepared in the same manner as in Example 1, except that an untreated SiO electrode was used in place of the SiO electrode on which the lithium metal-$Al_2O_3$ composite layer having an average thickness of 5 μm in the above example is formed as the negative electrode.

COMPARATIVE EXAMPLE 2

A battery was prepared in the same manner as in Example 1, except that powdered MgO was added to molten lithium and the resultant was extruded and coated on the surface of the SiO negative electrode of Example 1. At this time, the weight ratio of lithium and MgO was 8:2 and the coating thickness was 20 μm.

COMPARATIVE EXAMPLE 3

A battery was prepared in the same manner as in Example 1, except that the thickness of the lithium metal-inorganic composite layer was adjusted to 30 μm.

EXPERIMENTAL EXAMPLE 1

First Cycle Charge/Discharge Reversibility Test

The coin-type half-cell produced in the above Examples and Comparative Examples was subjected to a charge-discharge reversibility test using an electrochemical charging/discharging device. During the first cycle charge, the current was applied at a current density of 0.1C-rate up to a voltage of 0.005V (vs. Li/Li+) and discharged at the same current density up to a voltage of 1.5V (vs. Li/Li+). At that time, the charging capacity and the discharging capacity were measured, and the ratio (discharging capacity/charging capacity*100) was calculated and shown in Table 1.

EXPERIMENTAL EXAMPLE 2

Calorimetric Test

In order to perform differential scanning calorimetry, the coin-type half-cells of Examples and Comparative Examples were charged and discharged for 1 cycle as described above, and charged to 0.005 V in the second cycle to activate the negative electrode. 0.1 ml of electrolyte (an electrolytic solution in which 1 M lithium hexafluorophosphate ($LiPF_6$) was dissolved was injected into a solvent in which ethylene carbonate (EC) and diethyl carbonate (DEC) were mixed at a volume ratio of 50:50) was added to 13 mg of the thus-obtained charged negative electrode powder, and was then loaded to a DSC equipment (manufactured by Mettler Toledo). The thus-loaded sample was heated at a heating rate of 10° C./min, and the calorific value was measured. The results are shown in Table 1.

TABLE 1

| | First charge/discharge efficiency (%) | Onset(° C.) | Main peak(° C.) | Calorific value (J/g) |
|---|---|---|---|---|
| Example 1 | 88 | 115 | 292 | 1950 |
| Example 2 | 87 | 116 | 313 | 1856 |
| Example 3 | 89 | 118 | 350 | 1799 |
| Example 4 | 82 | 115 | 292 | 1598 |
| Example 5 | 97 | 115 | 292 | 2188 |
| Example 6 | 81 | 115 | 292 | 1573 |
| Example 7 | 88 | 114 | 290 | 1980 |
| Comparative Example 1 | 73 | 97 | 261 | 4150 |
| Comparative Example 2 | 108 (lithium precipitation) | 97 | 242 | 8156 |
| Comparative Example 3 | 125 (lithium precipitation) | 96 | 250 | 8423 |

The first cycle charge/discharge reversibility of Examples 1 to 7 was improved by 15% compared to Comparative Example 1. The reason why the reversibility of Example 1 was improved would be because the lithium metal of the lithium metal-inorganic composite layer formed on the surface of the SiO electrode reacted with SiO to cause a surface side reaction in advance and experienced volume change caused by charging, thereby making dead-lithium by volume expansion in advance. It is understood that the lithium metal consumed in the side reaction at the time of the first charge may be reduced by experiencing the side reaction in advance, and thus most of the lithium metal, which was inputted at the time of charging, was reversibly outputted.

In addition, the onset temperature and the main peak temperature of Examples 1 to 7 were higher than those of Comparative Examples, which means that the cell may be maintained safely to a higher temperature. Further, the fact that Examples 1 to 7 are smaller in calorific values than Comparative Examples is interpreted to mean that it may be safer at high temperature exposure. The reason why the SiO electrode in which the lithium metal-inorganic composite layer is introduced has a more safe result is because the lithium metal in the lithium metal-inorganic composite layer disappeared after the pre-lithiation, and the remaining inorganic material layer played a role as a protective layer for protecting the surface of SiO electrode.

Description of Symbols
100: negative electrode
200: lithium metal-inorganic mixed solution
201: lithium metal-inorganic composite layer
210: inorganic material powder
220: lithium metal powder
300: pre-lithiated negative electrode
400: inorganic layer

The invention claimed is:

1. A method of pre-lithiating a negative electrode for a secondary battery, the method comprising:
    adding a lithium metal powder, an inorganic material powder and a binder to a solvent,
    wherein the lithium metal powder in an amount of 20 to 40 parts by weight, the inorganic material powder in an amount of 60 to 80 parts by weight, and the binder in an amount of 1 to 10 parts by weight are added to the solvent,
    dispersing the lithium metal powder, the inorganic material powder and the binder in the solvent to prepare a mixed solution; and
    applying the mixed solution to the negative electrode to form a lithium metal-inorganic composite layer on the negative electrode, thereby forming the pre-lithiated negative electrode,
    wherein a thickness of the lithium metal-inorganic composite layer is 0.5 to 20 μm, and
    wherein the inorganic material powder comprises at least one selected from the group consisting of alumina ($Al_2O_3$), titanium dioxide ($TiO_2$), zirconium dioxide ($ZrO_2$), cerium oxide ($CeO_2$), magnesium oxide (MgO), calcium oxide (CaO), and yttria ($Y_2O_3$),
    wherein the binder comprises at least one selected from the group consisting of PVDF, SBR, and CMC, and
    wherein a solid content of the lithium metal and the inorganic material powder in the mixed solution is 50 wt % to 70 wt %.

2. The method of claim 1, wherein the mixed solution is applied to form the lithium metal-inorganic composite layer by coating, spraying, or lamination.

3. The method of claim 1, wherein particles of the lithium metal powder have an average particle diameter of 5 to 50 μm.

4. The method of claim 1, wherein particles of the inorganic particle powder have an average particle diameter of 0.1 to 10 μm.

5. The method of claim 1, wherein after an initial activation charge, the lithium metal-inorganic composite layer is converted to an inorganic material layer due to the fact that lithium metal in the lithium metal-inorganic composite layer does not remain in metallic form.

6. The method of claim 1, wherein the negative electrode comprises silicon oxide.

* * * * *